United States Patent
Takagi et al.

(10) Patent No.: US 7,163,481 B2
(45) Date of Patent: Jan. 16, 2007

(54) DRIVING FORCE TRANSMITTING SYSTEM

(75) Inventors: Akira Takagi, Obu (JP); Fuminori Suzuki, Okazaki (JP)

(73) Assignee: Denso Corporation (JP)

( * ) Notice: Subject to any disclaimer, the term of this patent is extended or adjusted under 35 U.S.C. 154(b) by 186 days.

(21) Appl. No.: 10/938,544

(22) Filed: Sep. 13, 2004

(65) Prior Publication Data
US 2005/0064975 A1    Mar. 24, 2005

(30) Foreign Application Priority Data
Sep. 18, 2003  (JP) ............................. 2003-326338

(51) Int. Cl.
*F16H 47/08* (2006.01)

(52) U.S. Cl. .................... 475/101; 475/91; 475/93; 475/99; 475/100; 475/116; 475/127; 192/3.57; 192/3.63; 192/85 R

(58) Field of Classification Search ................ 475/91, 475/93, 99, 100, 101, 116, 127; 192/3.57, 192/3.63, 85 AA, 85 R
See application file for complete search history.

(56) References Cited

U.S. PATENT DOCUMENTS 5,644,916 A * 7/1997 Hayasaki ..................... 60/436
6,390,947 B1 * 5/2002 Aoki et al. ..................... 477/3
6,554,736 B1 * 4/2003 Takano et al. ................. 477/5
6,997,299 B1 * 2/2006 Brissenden et al. ....... 192/85 R
2004/0192502 A1 * 9/2004 Suzuki et al. ............... 477/127

FOREIGN PATENT DOCUMENTS

| JP | 2000-046166 | | 2/2000 |
| JP | 2001-280458 | | 10/2001 |
| JP | 2002021993 A | * | 1/2002 |
| JP | 2002-195399 | | 7/2002 |

* cited by examiner

*Primary Examiner*—David D. Le
(74) *Attorney, Agent, or Firm*—Nixon & Vanderhye PC

(57) ABSTRACT

A manual valve is provided between a mechanical oil pump and a clutch of an automatic transmission device for connecting an engine with the automatic transmission device, a first check valve is provided in a passage connecting the mechanical oil pump with the manual valve, and an electric oil pump is provided in parallel with the mechanical oil pump, wherein the electric oil pump is operated during an idling stop of the engine and an output side of the electric oil pump is connected to the passage between the first check valve and the manual valve so that the working fluid from the electric oil pump is supplied to the clutch of the automatic transmission device through the manual valve. Accordingly, the electric oil pump can be made smaller and the supply of the working fluid from the electric oil pump to the clutch can be prevented when it is not necessary.

7 Claims, 1 Drawing Sheet

FIGURE
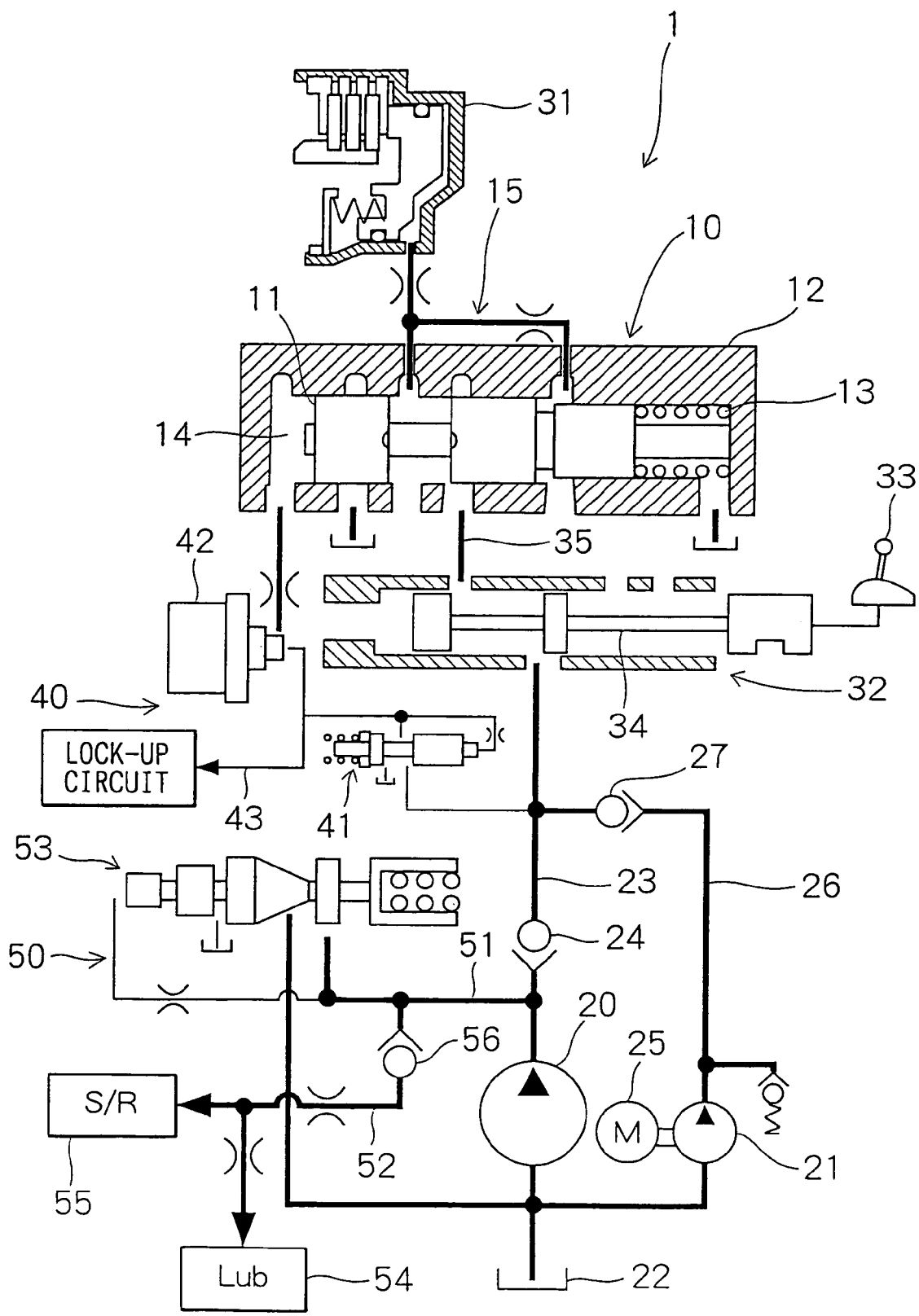

US 7,163,481 B2

DRIVING FORCE TRANSMITTING SYSTEM

CROSS REFERENCE TO RELATED APPLICATION

This application is based on Japanese Patent Application No. 2003-326338 filed on Sep. 18, 2003, the disclosure of which is incorporated herein by reference.

FIELD OF THE INVENTION

This invention relates to a driving force transmitting system, more particularly to a driving force transmitting system to be installed in a motor vehicle.

BACKGROUND OF THE INVENTION

A motor vehicle having an idling-stop system is under a development, wherein an engine operation is stopped to reduce carbon dioxides in exhaust gas from an internal combustion engine and to improve a fuel consumption ratio, in the case that the engine operation is in an idling operation and a time period for the idling operation exceeds a predetermined amount. When a clutch for an automatic transmission device is decoupled so that the automatic transmission device is disconnected from the engine during the engine operation is stopped under the idling-stop system, a delay for mechanical coupling at the clutch occurs at a re-start of the engine operation to move the vehicle. When such a delay occurs, a shock is generated at starting the vehicle, thereby decreasing a comfortable ride. To this end, the idling-stop system has been proposed in the prior arts, in which an electric oil pump is additionally provided in parallel with a mechanical oil pump, which is driven by an engine and supplying pressurized working fluid to the clutch for the automatic transmission device, so that the working fluid is continuously supplied from the electric oil pump to the clutch during the idling-stop of the engine. For example, such system is disclosed in Japanese Patent Publication No.2000-046166 and No.2001-280458.

In the above prior arts, however, an output side of the electric oil pump is connected not only to the clutch but to other oil circuits having mechanical devices other than the automatic transmission device. For example, the oil circuits include a lubricating device, a device for torque converter, and so on, which generally consume a larger quantity of working fluid. In those prior art system, the working fluid discharged from the electric oil pump flow into not only the clutch but those other oil circuits. As a result, a larger size of the electric oil pump is necessary because a larger quantity of the discharged working fluid is necessary to keep the mechanical coupling at the clutch.

In another prior art, for example as disclosed in Japanese Patent Publication No.2002-195399, the working fluid discharged from the electric oil pump is directly supplied to the clutch in order to avoid a large-sized electric oil pump. According to this prior art, the working fluid is prevented from flowing into the other oil circuits than the clutch.

It is, however, disadvantageous in this prior art in the following situation. The motor vehicle with the automatic transmission device has a shift lever, and the motor vehicle and/or the engine is controlled by and in accordance with a position of the shift lever. For example, when the shift lever is positioned at "P-range" or "N-range", the clutch between the engine and the automatic transmission device is generally decoupled.

When any problem occurs in the oil circuit between the electric oil pump and the clutch and/or when the operation of the electric oil pump can not be stopped, the working fluid may be continuously supplied from the electric oil pump to the clutch even in the case that the shift lever is moved to "N-range" or "P-range".

SUMMARY OF THE INVENTION

The present invention is made in view of the above problems, and it is an object of the present invention to provide a driving force transmitting system, which is small in size and reliable in operation. More exactly, the supply of the working fluid from oil pumps to a clutch provided between an engine and an automatic transmission device can be surely stopped, when the working fluid should not be supplied to the clutch.

According to one of features of the present invention, a change-over means (a manual valve operatively linked with a shift lever) is provided between a mechanical oil pump and a clutch of an automatic transmission device for connecting an internal combustion engine with the automatic transmission device, a first valve means is provided in a passage connecting the mechanical oil pump with the change-over means so that it allows the flow of working fluid discharged from the mechanical oil pump to the change-over means and it prohibits the flow of the working fluid in the reversed direction, and an electric oil pump is provided in parallel with the mechanical oil pump, wherein the electric oil pump is operated during an idling stop of the engine and an output side of the electric oil pump is connected to the passage between the first valve means and the change-over means so that the working fluid from the electric oil pump is supplied to the clutch of the automatic transmission device through the change-over means.

The change-over means controls an opening and a closing of an oil passage to the clutch depending on the position of the shift lever. Namely, when the shift lever is positioned at "N-range", for example, the change-over means closes the oil passage to the clutch to cut off the supply of the working fluid from the mechanical and electric oil pumps to the clutch.

Other oil circuits than the clutch, such as a lubricating device, branches off from the passage between the mechanical oil pump and the first valve means, so that the working fluid discharged from the electric oil pump is prevented by the first valve means from flowing into the other oil circuits. Accordingly, the electric oil pump can be made smaller and the supply of the working fluid from the electric oil pump (as well as the mechanical oil pump) to the clutch can be surely prevented by the change-over means when the supply of the working fluid is not necessary.

According to another feature of the present invention, a second valve means is provided in a passage connecting the electric oil pump with the change-over means so that it allows the flow of working fluid discharged from the electric oil pump to the change-over means and it prohibits the flow of the working fluid in the reversed direction, namely from the change-over means or the mechanical oil pump to the electric oil pump. Accordingly, it can be avoided that the mechanical oil pump becomes larger in size.

According to a further feature of the present invention, the other oil circuit includes the lubricating device and a line pressure control device, which generally consume a larger quantity of the working fluid. Since the other oil circuit branches off from the passage between the mechanical oil pump and the first valve means, the working fluid discharged from the electric oil pump is prevented by the first valve means from flowing into the other oil circuit. Accordingly, the electric oil pump can be made smaller.

According to a further feature of the present invention, an oil pressure control device is provided between the change-over means and the clutch of the automatic transmission device so that oil pressure of the working fluid to be supplied to the clutch and other related portions of the automatic transmission device can be controlled. According to this structure, the oil pressure of the working fluid is controlled to perform a necessary gear change at the automatic transmission device and in addition the supply of the working fluid to the clutch and other related portions of the automatic transmission device can be surely stopped when it is not necessary.

According to a further feature of the present invention, a control pressure generating device is provided, wherein it branches off from the passage between the first valve means and the change-over means. When the operation of the mechanical oil pump is stopped during the idling-stop of the engine, the working fluid from the electric oil pump is supplied to the control pressure generating device, so that the control of the oil pressure of the working fluid to be supplied to the clutch and the related portions of the automatic transmission device can be done even during the engine operation is stopped.

BRIEF DESCRIPTION OF THE DRAWING

The above and other objects, features and advantages of the present invention will become more apparent from the following detailed description made with reference to the accompanying drawing. In the drawing:

FIGURE is a schematic diagram showing a driving force transmitting system according to an embodiment of the present invention.

DETAILED DESCRIPTION OF THE PREFERRED EMBODIMENTS

The present invention will be explained below with reference to an embodiment.

FIGURE is a schematic diagram showing a driving force transmitting system according to an embodiment of the present invention. A driving force transmitting system 1 of the invention is installed in a motor vehicle (not shown) and controls transmission of a driving force from an internal combustion engine (not shown) to an automatic transmission device (not shown). The driving force transmitting system of this invention is used in the motor vehicle, in which so-called an idling-stop system is employed. The idling-stop system is a system in which an operation of the internal combustion engine is stopped when a predetermined time period goes by after the start of the idling operation of the engine.

The driving force transmitting system 1 comprises the internal combustion engine (not shown), a torque converter (not shown), the automatic transmission device (not shown) and an oil pressure control device 10 for controlling oil pressure for gear changes of the automatic transmission device. The system 1 further comprises a mechanical oil pump 20, an electric oil pump 21 driven by an electric motor 25, a forward movement clutch 31 of the automatic transmission device, a manual valve 32 as a change-over means, a control pressure generating device 40 for generating an oil pressure for controlling the system, and an oil circuit 50. The system 1 further comprises an electronic control unit (not shown) being composed of a micro-computer having CPU, ROM and RAM, and so on. The electronic control unit controls respective portions of the driving force transmitting system 1 (including the internal combustion engine, automatic transmission device, and so on) by carrying out a computer program installed in ROM.

The mechanical oil pump 20 is connected to a crank shaft (not shown) of the engine and thereby driven by the operation of the engine. The oil pump 20 sucks in working fluid, such as ATF, from an oil tank 22, and discharges the pressurized working fluid. The oil pump 20 supplies the pressurized working fluid to the manual valve 32 through a first output passage 23, wherein the first output passage 23 connects an output side of the oil pump 20 with the manual valve 32. In this first output passage 23, there is provided a first check valve 24, which allows a fluid flow from the oil pump 20 to the manual valve 32 and to the clutch 31 and which prohibits a fluid flow in the reversed direction, namely from the manual valve 32 and the clutch 31 to the oil pump 20. The oil circuit 50 branches off from a point of the first output passage between the oil pump 20 and the first check valve 24.

The electric oil pump 21 is driven by the electric motor 25, which is operated by electric power supplied from an electric power generator (not shown) driven by the engine or a battery (not shown). The electric power generated at the generator is charged in the battery. Accordingly, the electric motor 25 can be operated by the electric power from the battery to drive the electric pump 21, even when the engine operation is stopped. The electric oil pump 21 is provided in parallel with the mechanical oil pump 20, so that it sucks in the working fluid from the oil tank 22 and discharges the pressurized working fluid. The electric pump 21 supplies the pressurized working fluid to the manual valve 32 through a second output passage 26 and the first output passage 23, wherein the second output passage 26 connects an output side of the electric pump 21 with the first output passage 23 connected to the first check valve 24 at an opposite side of the oil pump 20. In this second output passage 26, there is provided a second check valve 27, which allows a fluid flow from the electric pump 21 to the manual valve 32 and to the clutch 31 and which prohibits a fluid flow in the reversed direction, namely from the manual valve 32 and the clutch 31 to the electric pump 21.

The manual valve 32 is operatively linked with a shift lever 33, which is operated by a driver of a motor vehicle. When the shift lever 33 is moved by the driver to a desired shift range among a plurality of the shift ranges, such as "P-range", "R-range", "N-range", "D-range" and so on, the transmission of the driving force from the engine to the automatic transmission device is controlled and a shift pattern of the automatic transmission is selected corresponding to the selected shift range. In addition to the above shift ranges, the shift ranges of "2-range", "L-range" and "GD-range" can be provided. A spool 34 of the manual valve 32 is moved back and forth in response to the shift range of the shift lever 33 moved by the driver. A connecting passage 35 is provided between the manual valve 32 and the oil pressure control device 10, so that a connection of the oil pressure control device 10 with the oil pump 20 or electric pump 21 is controlled by the movement of the spool 34. With a position of the spool 34 shown in FIGURE, corresponding to "D-range" of the shift lever 33, the connecting passage 35 is opened so that the pressurized working fluid is supplied from the first output passage 23 to the oil pressure control device 10 through the manual valve 32 and the connecting passage 35.

When the shift lever 33 is moved from "D-range" to "N-range", for example, the spool 34 is moved in the right hand direction in the drawing to close the connecting passage 35, so that the supply of the working fluid from the electric pump 21 (as well as from the mechanical oil pump 20) to the clutch 31 is cut off.

As above, the manual valve 32 operates as a change-over means for controlling the supply and cut-off of the working fluid from the oil pumps 20 and 21 to the forward movement clutch 31.

The oil pressure control device 10 comprises a housing 12 and a spool 11 reciprocally movable in the housing 12. Multiple piston ring lands are provided on the spool 11, and outer peripheral surfaces of the lands are in a sliding contact with an inner surface of the housing 12. The housing 12 is provided with multiple ports, which open at one ends to the inside of the housing and respectively connected to fluid passages at the other ends. A coil spring 13 is housed in the housing 12 at its one end for urging the spool 11 in one direction. The oil pressure control device 10 is further provided with a control pressure chamber 14 at the other end of the housing 12.

The control pressure generating device 40 comprises a modulating valve 41 and a solenoid valve 42, and is connected to the first output passage 23 at the position opposite to the oil pump 20, wherein the control pressure generating device 40 generates control pressure from the working fluid flowing through the first output passage 23 and applies the control pressure to the oil pressure control device 10. The working fluid controlled by the control pressure generating device 40 at a desired value of the control pressure is introduced into the control pressure chamber 14. An oil passage 43 branches off from the control pressure generating device 40 and is connected to a lock-up circuit, in which there are provided with a lock-up solenoid (not shown) for controlling oil pressure of the working fluid for the lock-up operation and with a solenoid (not shown) for likewise controlling oil pressure of the working fluid for a backward movement of the motor vehicle.

The spool 11 of the oil pressure control device 10 is held at such a position at which the oil pressure of the working fluid introduced into the control pressure chamber 14 is balanced with a spring force of the spring 13. Since the urging force of the spring 13 is generally constant, the axial position of the spool 11 is controlled by varying the oil pressure of the working fluid introduced into the control pressure chamber 14, which is adjusted at the control pressure generating device 40. The opening and closing conditions of the respective ports, namely the opening and closing of the connecting passage 35 as well as a control passage 15, are then controlled by the axial position of the spool 11. The oil pressure control device 10 is connected to the forward movement clutch 31 and other related portions of the automatic transmission device (not shown) through the control passage 15.

As above, the working fluid from the oil pressure control device 10 is supplied to the forward movement clutch 31, which comprises multiple dry-type or wet-type friction coupling elements. When the friction coupling elements are coupled with each other, an input shaft (not shown) of the automatic transmission device is connected with an output shaft (not shown) of the engine. As above, when the working fluid is supplied to the forward movement clutch 31, the automatic transmission device and the engine are connected with each other. The working fluid is also supplied to the automatic transmission device via the control passage 15. Accordingly, the oil pressure to be supplied to the automatic transmission device can be controlled by changing over the control passage 15 to be connected to the automatic transmission device. As a result, gear change will be carried out at the automatic transmission device.

As explained, the oil circuit 50 branches off from the first output passage 23 between the oil pump 20 and the check valve 24, and comprises a first oil circuit portion 51, a second oil circuit portion 52, a line pressure control valve 53 and a lubricating device 54. One end of the first oil circuit portion is connected to the first output passage 23, while the other end thereof is connected to the line pressure control valve 53. The second oil circuit portion 52 branches off at its one end from the first oil circuit portion 51, while the other end thereof is connected to the lubricating device 54 and a secondary regulator 55. In the second oil circuit portion 52, there is provided with a drain back check valve 56. The lubricating device 54 supplies the working fluid to friction coupling elements of the automatic transmission device to lubricate the same. The secondary regulator 55 generates and adjusts a control pressure of working fluid to be supplied to the torque converter.

An operation of the driving force transmitting system 1 will be explained.

The electronic control unit (not shown) starts a counting operation when it determines that the engine operation is changed to an idling operation. The determination of the idling operation is done by detecting an opening degree of a throttle valve, a rotational speed of the engine, a driving speed of the vehicle, and so on. It is, however, not determined that the engine operation is changed to the idling operation, when the motor vehicle is still moving even if the throttle valve is fully closed and the rotational speed of the engine is within a range corresponding to the idling operation. Further, when the throttle valve is opened, the rotational speed of the engine is increased, or the running speed of the vehicle is changed, the electronic control unit resets the counting operation.

When the engine is in the operation other than the idling operation, or when the time period for the idling operation is not exceeding a predetermined amount, the engine operation is continued. And therefore, the oil pump 20 is kept driven by the engine to discharge the pressurized working fluid. The working fluid having a predetermined pressure opens the first check valve 24 and is supplied to the forward movement clutch 31 through the first output passage 23, the manual valve 32 and the oil pressure control device 10. The working fluid from the oil pump 20 is also supplied to the lubricating device 54 and the secondary regulator 55 of the oil circuit 50, from which the working fluid is further supplied to the respective portions of the system 1.

When it is determined by the electronic control unit that the engine is in the idling operation and the time period for the idling operation exceeds the predetermined amount, fuel supply to the engine is cut off and the engine operation is stopped. With the stop of the engine operation, the operation of the oil pump 20 is stopped, so that the oil pressure of the working fluid from the oil pump 20 becomes zero. When the engine operation is stopped, the electronic control unit starts supply of electric power to the electric motor 25 from the battery to start the operation of the electric pump 21. The electric pump 21 sucks in the working fluid from the oil tank 22 and discharges the pressurized working fluid to the second output passage 26. In this operation, since the operation of the oil pump 20 is stopped, the oil pressure of the working fluid at the second check valve 27 on the side of the electric pump 21 is higher than that on the side of the oil pump 20, so that the second check valve 27 is opened to supply the pressurized working fluid to the manual valve 32 through the first output passage 23. The flow of the working fluid from the first output passage 23 to the oil pump 20 is prevented by the first check valve 24, so that the working fluid from the electric pump 21 is prevented from flowing into the oil circuit 50.

The working fluid supplied from the electric pump 21 to the manual valve 32 is further supplied to the oil pressure control device 10 via the connecting passage 35, when the connecting passage 35 is opened by the movement of the spool 11, wherein the position of the spool 11 is controlled by the shift lever 33. Since the control pressure generating device 40 is connected at its one end to a joint portion of the first and second output passages 23 and 26, the working fluid from the electric pump 21 is supplied to the control pressure generating device 40, so that the oil pressure control device 10 is operated by the oil pressure of the working fluid introduced into the control pressure chamber 14. The working fluid supplied from the connecting passage 35 to the oil pressure control device 10 is then supplied to the forward movement clutch 31 via the control passage 15 changed over by the oil pressure control device 10. As above, the coupling of the multiple coupling elements of the forward movement clutch 31 is kept so that the input shaft of the automatic transmission device and the output shaft of the engine remain connected.

When the acceleration pedal is pressed by the vehicle driver, or when the shift lever 33 is changed from "N-range" or "P-range" to "D-range", the electronic control unit starts the running of the engine. With re-start of the engine running, the driving force is transmitted from the output shaft of the engine to the input shaft of the automatic transmission device. At this operation, the driving force of the engine can be transmitted smoothly and without delay to the automatic transmission device, because the forward movement clutch 31 is keeping the coupling by the working fluid supplied from the electric pump 21.

As explained above, the electric pump 21 supplies the working fluid to the forward movement clutch 31 according to the embodiment of the present invention. And therefore, even when the engine operation is stopped, the working fluid is continuously supplied to the forward movement clutch 31 by the electric pump 21, so that the coupling condition at the clutch 31 is kept even during the idling-stop operation. As a result, a delay for the mechanical coupling at the clutch 31 at the re-start of the engine running can be prevented, and a shock of the vehicle to be caused by the delay of the mechanical coupling can be likewise prevented.

According to the embodiment of the present invention, the working fluid discharged from the electric pump 21 is prevented from flowing into the oil pump 20 and to the oil circuit 50. Accordingly, even in the case that the oil circuit 50 having the lubricating device 54 (which consumes much of the working fluid) is provided in the driving force transmitting system, the working fluid from the electric pump 21 is prevented from flowing into the oil circuit. As a result, the miniaturization of the electric pump 21 can be realized, because it is enough for the electric pump 21 to have a capacity which only enables and keeps the mechanical coupling at the forward movement clutch 31.

According to the embodiment of the present invention, the working fluid discharged from the electric pump 21 is supplied to the forward movement clutch 31 through the manual valve 32 and the oil pressure control device 10. It is sufficient that the working fluid is supplied to the forward movement clutch 31 from the electric pump 21 only when the mechanical coupling is necessary during the idling-stop operation. Even in the case that the operation of the electric pump 21 were kept due to any failure, the supply of the working fluid to the forward movement clutch 31 can be surely cut off by means of the manual valve 32 and/or the oil pressure control device 10 when it is not necessary, and on the other hand, the working fluid can be supplied to the forward movement clutch 31 by means of the manual valve 32 and the oil pressure control device 10 only when it is necessary. As a result, unnecessary mechanical coupling at the forward movement clutch 31 can be prevented to enhance safety of the system.

Furthermore, according to the embodiment of the present invention, the second check valve 27 is provided in the second output passage 26, so that the working fluid from the oil pump 20 is prevented from flowing into the electric pump 21. Accordingly, it is not necessary to increase the capacity of the oil pump 20 and thereby it can be avoided that the size of the oil pump 20 would become unnecessarily larger.

In the above embodiment, the check valves are used in the first and second output passages for controlling ON and OFF of those passages. It is, however, not limited to the check valves. Any other mechanical valve means or electromagnetic valves for opening and closing the passages can be used in the invention.

What is claimed is:

1. A driving force transmitting system for a motor vehicle having an idling-stop system, comprising:
    a mechanical oil pump to be driven by an internal combustion engine and operatively connected to an automatic transmission device for supplying working fluid to the automatic transmission device;
    an electric oil pump to be driven by an electric motor and operatively connected to the automatic transmission device for supplying working fluid to the automatic transmission device, wherein the electric oil pump is provided in parallel with the mechanical oil pump;
    a forward movement clutch operatively connected between the internal combustion engine and the automatic transmission device for transmitting a driving force of the internal combustion engine to the automatic transmission device when the forward movement clutch is mechanically coupled by operation of the working fluid;
    a first valve provided in a first passage connecting the mechanical oil pump with the forward movement clutch at an output side of the mechanical oil pump for opening the first passage so that the working fluid discharged from the mechanical oil pump may flow to the forward movement clutch and for closing the first passage so that the working fluid is prevented from flowing from the forward movement clutch to the mechanical oil pump;
    a manual valve operatively linked with a shift lever of the motor vehicle and provided in the first passage between the first valve and the forward movement clutch for controlling the flow of the working fluid depending on a position of the shift lever;
    an oil circuit branching off from the first passage at a point between the mechanical oil pump and the first valve, so that the working fluid discharged from the mechanical oil pump flows into the oil circuit; and
    an oil pressure control device for controlling oil pressure of the working fluid to be supplied to the automatic transmission device, wherein the working fluid flows into the oil pressure control device through the manual valve, wherein an output side of the electric oil pump is operatively connected to the first passage at a jointing point between the first valve and the manual valve so that the electric oil pump is connected to the forward movement clutch through the manual valve, wherein the idling-stop system actuates the electronic oil pump to operate during idling-stop of the internal combustion engine, so that the working fluid is supplied from the electric oil pump to the forward movement clutch to engage the forward movement clutch during said idling-stop of the internal combustion engine.

2. A driving force transmitting system according to claim 1, further comprising:

a second valve provided in a second passage connecting the electric oil pump with the jointing point for opening the second passage so that the working fluid discharged from the electric oil pump may flow to the forward movement clutch and for closing the second passage so that the working fluid is prevented from flowing from the forward movement clutch to the electric oil pump.

3. A driving force transmitting system according to claim 1 or 2, wherein the oil circuit comprises:

a line pressure control means for controlling a line pressure of the working fluid; and a lubricating device for lubricating an inside of the automatic transmission device.

4. A driving force transmitting system according to claim 1, further comprising:

a control pressure generating device branching off fro the first passage between the first valve and the manual valve, and for controlling oil pressure of the working fluid to be supplied to the oil pressure control device.

5. A method of supplying working fluid in a driving force transmitting system for a motor vehicle having an idling-stop system, comprising:

providing the driving force transmitting system including:

a mechanical oil pump to be driven by an internal combustion engine and operatively connected to an automatic transmission device for supplying working fluid to the automatic transmission device;

an electric oil pump to be driven by an electric motor and operatively connected to the automatic transmission device for supplying working fluid to the automatic transmission device, wherein the electric oil pump is provided in parallel with the mechanical oil pump;

a forward movement clutch operatively connected between the internal combustion engine and the automatic transmission device for transmitting a driving force of the internal combustion engine to the automatic transmission device when the forward movement clutch is mechanically coupled by operation of the working fluid;

a first valve provided in a first passage connecting the mechanical oil pump with the forward movement clutch at an output side of the mechanical oil pump for opening the first passage so that the working fluid discharged from the mechanical oil pump may flow to the forward movement clutch and for closing the first passage so that the working fluid is prevented from flowing from the forward movement clutch to the mechanical oil pump;

a manual valve operatively linked with a shift lever of the motor vehicle and provided in the first passage between the first valve and the forward movement clutch for controlling the flow of the working fluid depending on a position of the shift lever;

an oil circuit branching off from the first passage at a point between the mechanical oil pump and the first valve, so that the working fluid discharged from the mechanical oil pump flows into the oil circuit; and an oil pressure control device for controlling oil pressure of the working fluid to be supplied to the automatic transmission device, wherein the working fluid flows into the oil pressure control device through the manual valve, wherein an output side of the electric oil pump is operatively connected to the first passage at a jointing point between the first valve and the manual valve so that the electric oil pump is connected to the forward movement clutch through the manual valve, supplying working fluid to the automatic transmission device with the mechanical oil pump during engine operation; and when said idling-stop system determines that the internal combustion engine is in an idling operation and a condition for idling-stop is satisfied, stopping operation of the engine and starting supply of electric power to the electric motor of the electric oil pump, so that the electric oil pump supplies working fluid to the forward movement clutch to engage the forward movement clutch during said idling-stop of the engine.

6. A method of supplying oil as in claim 5, wherein the electric motor of the electric oil pump is operated by electric power supplied from an electric power generator driven by the internal combustion engine or from a battery.

7. A method of supplying oil as in claim 5, wherein said condition is a predetermined time period for idling operation.

* * * * *